W. L. GOLDSTEIN.
AUTOMATIC FENDER.
APPLICATION FILED AUG. 23, 1918.
1,305,714.
Patented June 3, 1919.
2 SHEETS—SHEET 1.
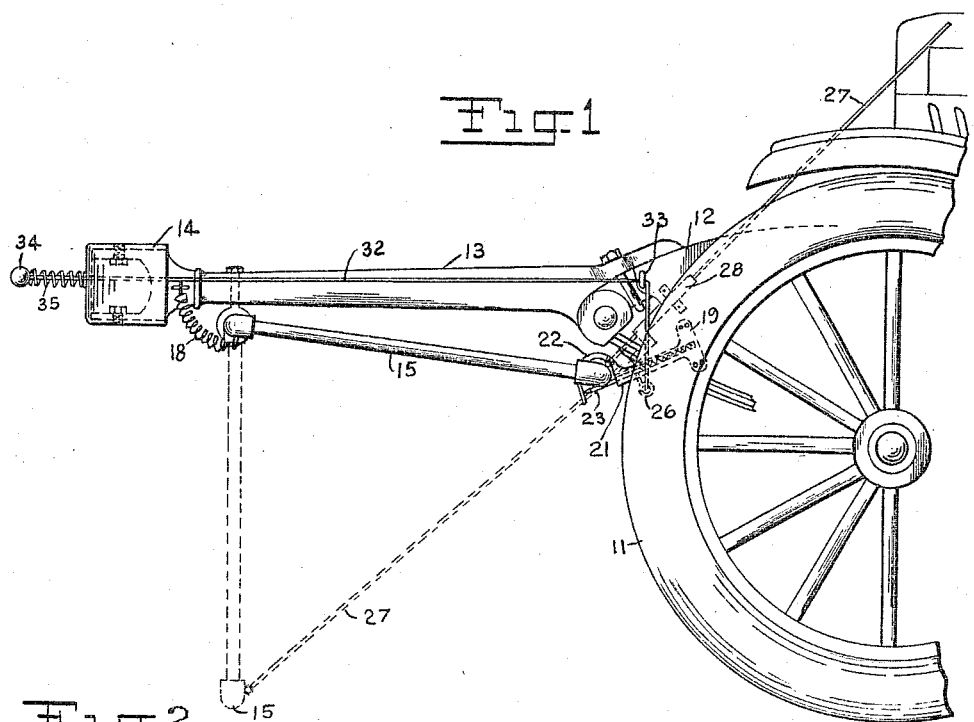
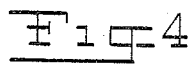
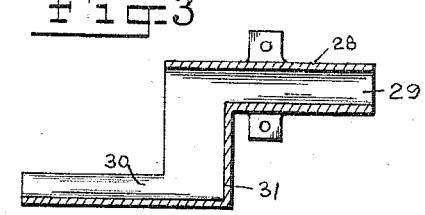
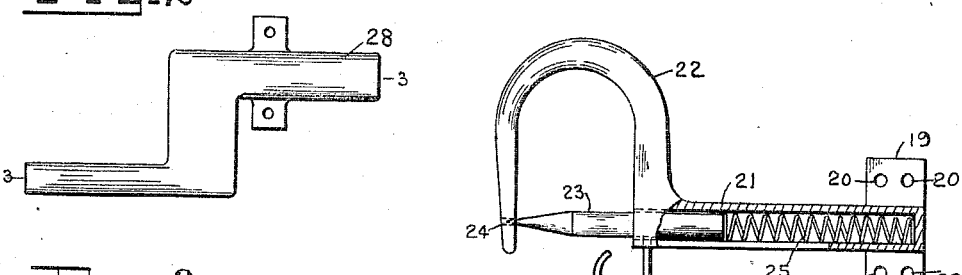
Inventor:
William Leon Goldstein
By his Attorney
Edmond Conger Brown W. L. GOLDSTEIN.
AUTOMATIC FENDER.
APPLICATION FILED AUG. 23, 1918.
1,305,714.
Patented June 3, 1919.
2 SHEETS—SHEET 2.
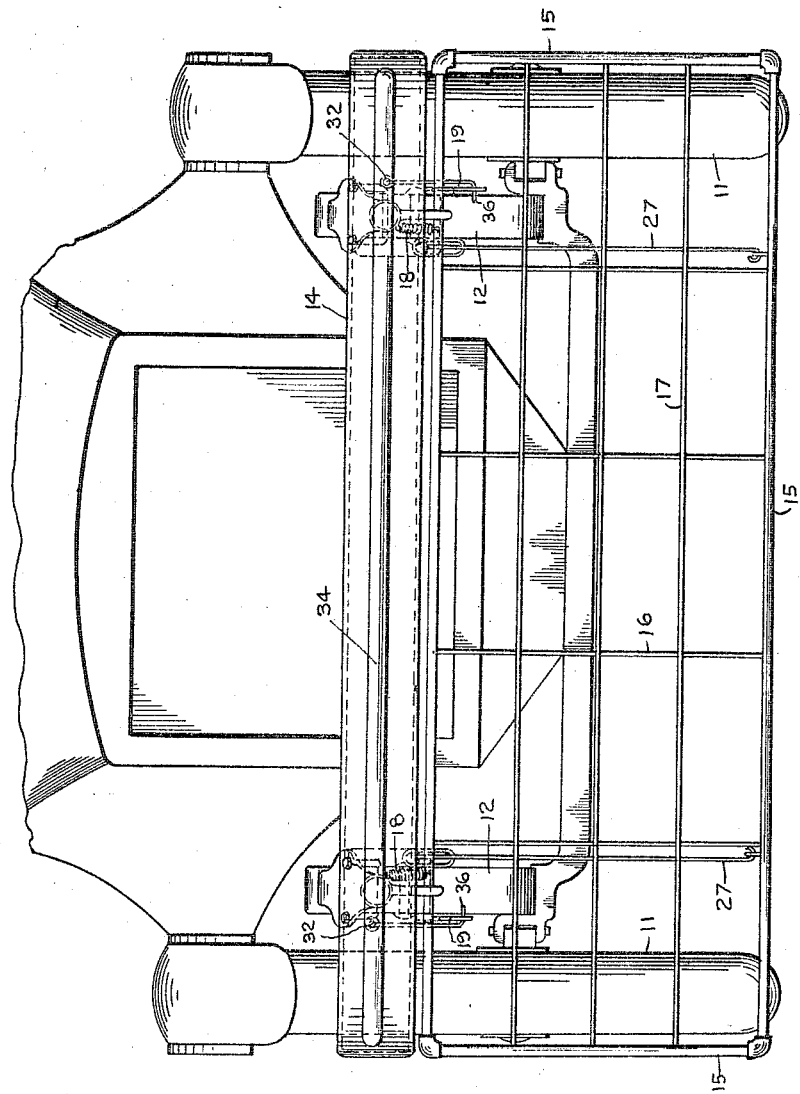

UNITED STATES PATENT OFFICE.

WILLIAM LEON GOLDSTEIN, OF NEW YORK, N. Y.

AUTOMATIC FENDER.

1,305,714.

Specification of Letters Patent.

Patented June 3, 1919.

Application filed August 23, 1918. Serial No. 251,166.

*To all whom it may concern:*

Be it known that I, WILLIAM LEON GOLDSTEIN, a citizen of the United States, and a resident of the borough of Manhattan, city, county, and State of New York, have invented certain new and useful Improvements in Automatic Fenders, of which the following is a specification.

The invention relates to automatic fenders for automobiles, cars, and other vehicles and has for one of its principal objects to provide means of the kind mentioned which shall be simple in construction, easily attached to the vehicle, and efficient in operation, looking toward the prevention of accidents and injury to life and limb.

The invention consists in the novel construction, arrangement and combination of various elements and parts as fully described in this specification and shown in the accompanying drawings.

In the said drawings, Figure 1 is a side view of a device embodying my invention and showing also a small portion of an automobile to which my automatic fender is attached; Fig. 2 is a side view of a portion of the means for maintaining the fender in its lowered or operative position; Fig. 3 is a longitudinal section of the same; Fig. 4 is a side view, partly in section, of a portion of the means for maintaining the fender in its raised or inoperative position; and Fig. 5 is a front view of Fig. 1.

In carrying my invention into effect in the embodiment thereof which I have selected for the purpose of description and illustration in this specification and in the accompanying drawing I provide, in connection with an automobile of the usual or ordinary construction, having forward wheels 11 and longitudinally extending elliptical springs 12, forwardly extending arms 13 bearing at their outer ends a bumper bar 14 of the usual or any suitable construction. These forwardly extending arms 13 may be secured to the elliptical springs 12 by being clamped thereto by means of U-bolts and nuts or in any suitable manner, so as to form a sufficiently firm and rigid construction. In the case of an automobile not having longitudinally extending elliptical springs, or having such springs located in such a way as to not be readily accessible, the arms 13 may of course be secured to any suitable and available part of the automobile.

Pivotally secured near the forward ends of the arms 13, or if desired to the bumper 14, or other suitable location, is a swinging fender comprising a frame 15, transverse bars 16 and longitudinal bars 17, forming a grating, in a manner which will be readily understood and which is shown particularly in Fig. 5. This fender is pivotally hung in such a way as to permit it to either lie in the elevated position shown in full lines in Fig. 1 or in the approximately vertical position shown in the dotted lines in Fig. 1 and in the full lines in Fig. 5. When the fender is in its elevated position its inner or rear end is supported by the devices next to be described, but when these supporting devices are released, the fender falls or swings into its vertical position, partly by gravity and partly by the action of the springs 18, shown best in Fig. 1.

Secured to each of the elliptical springs 12 is a device, shown in detail in Fig. 4, which serves to support the inner or rear end of the fender when the same is in its elevated or inoperative position. This device consists of a plate 19, provided with apertures 20 through which a U-bolt or similar device may be passed for clamping to the elliptical springs 12, or it may be attached to said springs or to said automobile in any suitable manner. Secured to the said plate 19 is a tube 21 having at its outer end a hook shaped member 22. Located partly within the tube 21 is a rod 23, which preferably has its outer end tapered so that the point is adapted to enter a socket 24 near the end of the hook 22. The rod 23 is normally maintained in its extended position, as shown in Fig. 4 by a helical spring 25 located within the tube 21. The rod 23 is provided with a downwardly extending hooked member 26. When the fender is in its elevated or inoperative position one part of the frame of the same rests inside of the hook 22 and is there supported by the rod 23, as is shown in Fig. 1.

Pivotally secured to the lower part of the frame 15 of the fender (see Figs. 1 and 5) are rods 27 which pass rearward therefrom and through tubular members 28 which are preferably secured to the inner sides of the elliptical springs 12, or in any other suitable position on the automobile. These tubular members 28 are of peculiar shape and are shown more particularly in Figs. 2 and 3, Fig. 2 being an external view and Fig. 3 a longitudinal vertical section of the same. When the fender is in its elevated or inoperative position as shown in full lines in Fig. 1, the rods 27 pass through the openings 29 (see Fig. 3) in the upper part of the member 28 and extend backward as shown in Fig. 1; when however the fender is in its lowered or operative position the rods 27 slide forward through the channel 29 and the rear ends drop down into the channel 30 (see Fig. 3) and abut against the walls 31, thereby preventing the fender from swinging back again until the rods 27 are lifted up so that they may again pass back through the tubular channel 29.

The mechanism for releasing the fender from its elevated or inoperative position is as follows: I provide L-shaped rods 32 (see Fig. 1) the forward ends of which are supported by passing through suitable openings in the bumper 14 and the rear ends of which are supported by rings 33 attached to the springs 12 or in any other suitable location. The forward ends of the rods 32 extend some little distance ahead of the bumper 14 and are connected by a transverse movable bumper rod 34. Helical springs 35 are located around the forward ends of the rods 32, between the bumper 14 and the transverse rod 34 (see Fig. 1) for the purpose of keeping the rods 32 normally in their forwardly extending position. The rear ends of the rods 32 are bent at a right angle and extend downwardly, as best shown in Fig. 1, their extreme ends however being again bent at right angles as shown at 36 in Fig. 5 and pass through hooks 26. It will be readily seen that if the movable bumper 34 is pushed backward the rods 32 are also pushed backward carrying with them the rod 23 (Fig. 4) and allowing the fender to swing down into its lowered or operative position.

The operation of my invention is as follows: The vehicle to which the fender is attached being in motion, and the fender being in the elevated position shown in the full lines in Fig. 1, if a person or object that cannot be avoided happens to be struck by the movable bumper 34, the latter will be pushed backward, carrying with it the rods 32 and the rod 23, thereby releasing the rearward side of the fender and allowing it to swing downward into its vertical position shown in the dotted lines in Fig. 1, the rods 27 at the same time sliding forward through the tubular channel 29 and their rear ends dropping down into the channel 30 of the member 28 (see Fig. 3). Their rear ends then abut against the walls 31 of the members 28 and the fender is prevented from swinging backward and should the vehicle not be stopped in time it would be impossible for it to run over any person or object in front of the same, as such person or object would be pushed or rolled along by the fender until such time as the motion of the vehicle may be stopped. When it is desired to restore the fender to its lifted or inoperative position, the rods 27 are raised so as to release their rear ends from the walls 31 and allow them to pass backward through the channel 29, the fender being at the same time swung upward into an approximately horizontal position. The rods 23 (see Fig. 4) are then pushed backward and the fender frame placed in the hooks 22 and the rods 23 allowed to spring forward again and the ends thereof to be seated in the sockets 24, whereby the fender is securely maintained in its inoperative position.

The advantages of my invention will be obvious from what has been above said with regard to its construction and operation.

I do not limit myself to the particular construction which I have above described and herewith illustrated, which constitutes only one embodiment of the invention. It is obvious that various other forms of the same could be employed without departing from the spirit and scope of my invention.

Having thus described my invention, what I claim as new and desire to secure by Letters Patent, is as follows:

1. An automatic fender for vehicles, comprising supporting members adapted to be secured to and extend forwardly from a vehicle, a substantially rigid fender swingingly supported by said supporting members, devices adapted to maintain said fender in an elevated or inoperative position, devices adapted to release said fender and allow it to swing into a lowered or operative position, and devices adapted to lock said fender in its lowered or operative position.

2. An automatic fender for vehicles, comprising supporting members adapted to be secured to and extend forwardly from a vehicle, a fender swingingly supported by said supporting members, devices adapted to maintain said fender in an elevated or inoperative position, said devices comprising a tubular member and a rod slidable therein adapted to project forward and support said fender or to move backward and release said fender, devices adapted to release said fender and allow it to swing into a lowered or operative position, and devices adapted to lock said fender in its lowered or operative position.

3. An automatic fender for vehicles, comprising supporting members adapted to be secured to and extend forwardly from a vehicle, a fender swingingly supported by said supporting members, devices adapted to maintain said fender in an elevated or inoperative position, said devices comprising a tubular member, a rod slidable therein adapted to project forward and support said fender or to move backward and release said fender, and a spring adapted to hold said rod normally in its forward position, devices adapted to release said fender and allow it to swing into a lowered or operative position, and devices adapted to lock said fender in its lowered or operative position.

4. An automatic fender for vehicles, comprising supporting members adapted to be secured to and extend forwardly from a vehicle, a fender swingingly supported by said supporting members, devices adapted to maintain said fender in an elevated or inoperative position, devices adapted to release said fender and allow it to swing into a lowered or operative position, said devices comprising a movable bumper member, and means operatively connecting same with said fender supporting devices, and devices adapted to lock said fender in its lowered or operative position.

5. An automatic fender for vehicles, comprising supporting members adapted to be secured to and extend forwardly from a vehicle, a fender swinging supported by said supporting members, devices adapted to maintain said fender in an elevated or inoperative position, devices adapted to release said fender and allow it to swing into a lowered or operative position, said devices comprising a movable bumper member, means operatively connecting same with said fender supporting devices, and a spring adapted to lock said movable bumper member in its inoperative position; and devices adapted to maintain said fender in its lowered or operative position.

6. An automatic fender for vehicles, comprising supporting members adapted to be secured to and extend forwardly from a vehicle, a fender swingingly supported by said supporting members, devices adapted to maintain said fender in an elevated or inoperative position, devices adapted to release said fender and allow it to swing into a lowered or operative position, and devices adapted to lock said fender in its lowered or operative position, said last named devices comprising a rod pivotally secured to said fender and a stop adapted to prevent the movement of said rod.

In witness whereof I have hereunto signed my name this 22nd day of August 1918.

WILLIAM LEON GOLDSTEIN.

Copies of this patent may be obtained for five cents each, by addressing the "Commissioner of Patents, Washington, D. C."